(12) United States Patent  (10) Patent No.: US 12,430,171 B2
Wintrode  (45) Date of Patent: Sep. 30, 2025

(54) OPEN DISTRIBUTED ASYNCHRONOUS DEPENDENCY-BASED CONTENT PROCESSING

(71) Applicant: Raytheon Applied Signal Technology, Inc., Sunnyvale, CA (US)

(72) Inventor: Jonathan Wintrode, Annapolis, MD (US)

(73) Assignee: Raytheon Applied Signal Technology, Inc., Sunnyvale, CA (US)

( * ) Notice: Subject to any disclaimer, the term of this patent is extended or adjusted under 35 U.S.C. 154(b) by 533 days.

(21) Appl. No.: 17/878,777

(22) Filed: Aug. 1, 2022

(65) Prior Publication Data

US 2024/0036922 A1    Feb. 1, 2024

(51) Int. Cl.
*G06F 9/48* (2006.01)
*G06F 9/54* (2006.01)

(52) U.S. Cl.
CPC ............ *G06F 9/4887* (2013.01); *G06F 9/546* (2013.01)

(58) Field of Classification Search
None
See application file for complete search history.

(56) References Cited

U.S. PATENT DOCUMENTS

| 8,042,142 | B1* | 10/2011 | Doshi | H04N 21/2343 725/98 |
| 9,032,207 | B2 | 5/2015 | Onno | |
| 9,727,613 | B2 | 8/2017 | Zhang et al. | |
| 2008/0152319 | A1* | 6/2008 | Liang | H04N 21/6379 386/231 |
| 2008/0178180 | A1* | 7/2008 | Sporny | G06F 9/4887 718/102 |
| 2009/0203368 | A1* | 8/2009 | Marsyla | G06F 9/45512 455/418 |
| 2013/0268856 | A1* | 10/2013 | Hejl, Jr. | A63F 13/00 715/716 |
| 2016/0034306 | A1* | 2/2016 | Galdy | G06F 9/4881 718/104 |
| 2017/0068571 | A1* | 3/2017 | Lu | G06F 9/5016 |
| 2017/0140318 | A1* | 5/2017 | Platakis | G06Q 10/0631 |
| 2018/0278551 | A1* | 9/2018 | Carpenter | H04L 12/4633 |

(Continued)

*Primary Examiner* — Charles E Anya
(74) *Attorney, Agent, or Firm* — Schwegman Lundberg & Woessner, P.A.

(57) ABSTRACT

Method for distributed asynchronous dependency-based content processing includes: receiving a multi-media digital content and a task to be performed on the multi-media digital content; determining types of the multi-media digital content; generating a workflow graph for each type of the content, each workflow graph including data dependency conditions of the task; generating a task message for each workflow graph; broadcasting the task messages to a respective task queue of an initial state of a workflow manager; responding to the broadcast task messages by a respective processing node; processing the task based on the respective workflow graph in the broadcast task message, and including a result of the processing for each workflow graph in a result message; broadcasting the result messages by the respective processing node; accumulating the broadcast result messages responsive to respective workflow graphs; and outputting the accumulated results to a user or an external system.

20 Claims, 3 Drawing Sheets

(56) References Cited

U.S. PATENT DOCUMENTS

2021/0195145 A1\* 6/2021 Scott ........................ G06T 7/11
2022/0295134 A1\* 9/2022 Bhide .................... G16Y 10/75
2024/0202043 A1\* 6/2024 Demidov .............. G06F 9/4806

\* cited by examiner

```
{
    METADATA: {...},   # Information about the data
    DATA/URI:  {...},   # Pointer to data
}
```

FIG. 3B

```
{
    METADATA: {...},         # Information about the data
    DATA/URI: {...},         # Pointer to data
    WORKFLOW: {...},         # Current workflow
    TASK: analytic_name,     # Requested task
    RESULTS:  {...}          # Any previous results
}
```

FIG. 3C

```
{
    METADATA: {...},         # Information about the data
    DATA/URI: {...},         # Pointer to data
    WORKFLOW: {...},         # Current workflow
    TASK: analytic_name,     # completed task
    RESULTS:  {...}          # Updated with task results
}
```

OPEN DISTRIBUTED ASYNCHRONOUS DEPENDENCY-BASED CONTENT PROCESSING

FIELD OF THE INVENTION

The disclosed invention generally relates to digital content and signal processing, and more particularly to open distributed asynchronous dependency-based content processing.

BACKGROUND

Digital data is expected to grow more than 60% to by 2025. According to some, around 10% of enterprise-generated data is created and processed outside a traditional centralized data center or cloud. By 2025, it is predicted that this distributed processing will reach 75%. The increase of Internet of things (IoT) devices at the edge of a computation network is producing a massive amount of data, but storing and using all that data in cloud data centers imposes a significant impact on network bandwidth requirements. Despite the improvements of network technology, data centers cannot guarantee acceptable transfer rates and response times, which, however, often is a critical requirement for many applications. Furthermore, devices at the edge of the network constantly consume data coming from the cloud, forcing companies to decentralize data storage and service provisioning, leveraging physical proximity to the end user.

Edge computing is a distributed computing paradigm that brings computation and data storage closer to the sources of data. This improves response times and save network bandwidth. The aim of edge computing is to move the computation away from data centers towards the edge of the network, exploiting smart objects, mobile phones, or network gateways to perform tasks and provide services on behalf of the cloud. By moving services to the edge of the network, it is possible to provide content caching, service delivery, persistent data storage, and IoT management resulting in better response times and transfer rates. At the same time, distributing the logic to different network nodes introduces new issues and challenges.

For example, extracting information from audio, image, text, or cyber content depends on a series of algorithms where input to one depends on output from another. For different customers and use cases dependencies and workflows (series of steps) varies widely. Workflows need to be changed for new deployments or in running systems, dictated by changing data conditions, without turning off whole system and incurring downtime. Computation requirements typically must scale with the volume of data ingested by the system. System maintainers cannot afford to incur software development costs (time and money) to re-configure the order or scale of algorithms.

Therefore, there is a need for a framework to allow edge devices to orchestrate computations while maintaining dependencies.

SUMMARY

In some embodiments, the disclosure is directed to a method for distributed asynchronous dependency-based content processing in a multi-node processing environment. The method includes: receiving a multi-media digital content including metadata and a task to be performed on the multi-media digital content; determining types of the multi-media digital content responsive to the metadata; generating a workflow graph for each type of the multi-media digital content responsive to the types and the task, wherein each workflow graph includes data dependency conditions of the task; generating a task message for each workflow graph, wherein each task message includes a respective workflow graph, the task to be performed, pointers to required data, and a result of a previous operation based on the data dependency conditions of the task; broadcasting the task messages to a respective task queue of an initial state of a workflow manager; responding to the broadcast task messages by a respective processing node in the multi-node processing environment; processing the task based on the respective workflow graph in the broadcast task message, and including a result of the processing for each workflow graph in a result message; broadcasting the result messages by the respective processing node; accumulating the result messages broadcast from the respective processing node responsive to respective workflow graphs; and outputting the accumulated results to a user or an external system.

In some embodiments, the messages use an advanced message queuing protocol (AMQP). In some embodiments, the multi-media digital content is received from an application programming interface (API), from a server via a message, or from other processing nodes in the multi-node processing environment via a message.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAIL DESCRIPTION

Some embodiments of the disclosure are related to an asynchronous, configurable, and scalable message-passing system to execute content analytic workflows across one or more processing threads located on a single or multiple processor (edge devices), using edge analysis. Workflows are defined as a graph connecting discrete algorithm components such as language id, face detection, keyword spotting, or speech recognition. Dependency links in the graph describe where certain algorithms produce output used by subsequent steps. For example, speech recognition requires the locations of speech, which is produced by speech activity detection. These dependencies are customizable based on different customer applications; therefore, the present disclosure allows for changing workflows and scalable compute resources to be configured and enabled.

Each processing (service) node includes electronics, communications and processing circuit for tracking targets, executing the auction processes and sending messages. The term "processing circuit" is used herein to mean any combination of hardware, firmware, and software, employed to process data or digital signals. Processing circuit hardware may include, for example, application specific integrated circuits, general purpose or special purpose central processing units (CPUs), digital signal processors, graphics processing units, and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Figure 1:
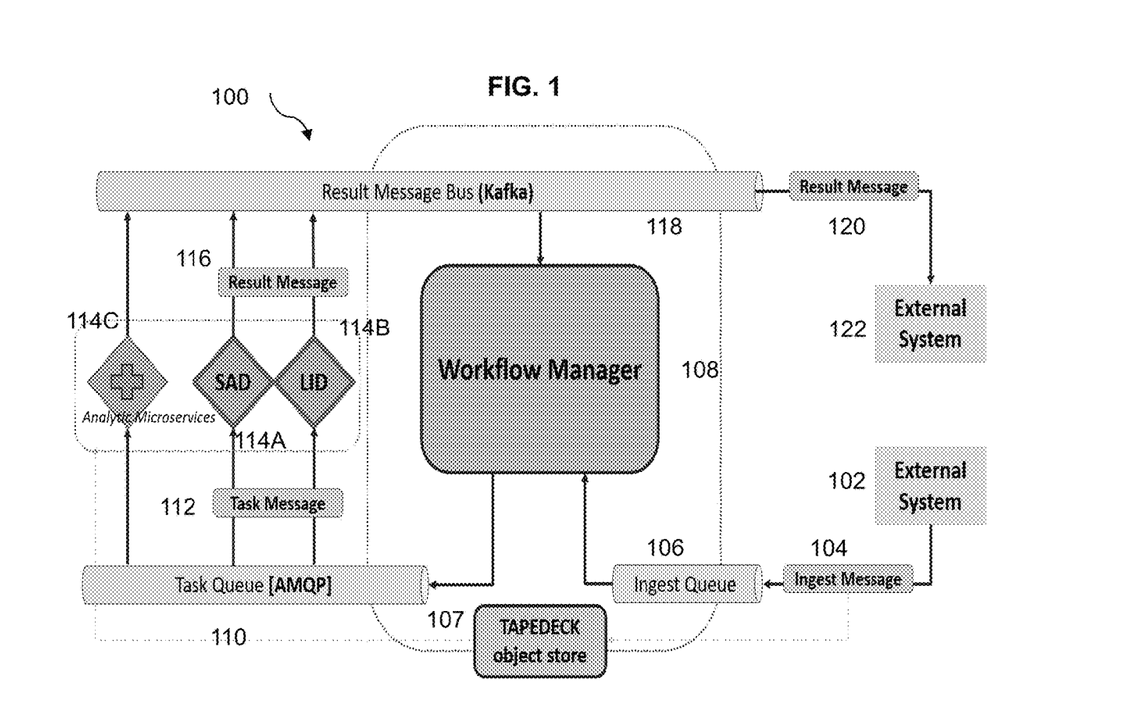
FIG. 1 depicts an exemplary system for distributed asynchronous dependency-based content processing, according to some embodiments of the disclosure.

According to some embodiments of the disclosure, data or pointers to data are transmitted to the component analytics (services) in messages, rather than a monolithic application with hard-code software (e.g., IBM's System S). The disclosure manages the dependencies between components and flow of information rather than optimizing compute resource (e.g., Amazon Web Services (AWS)), and makes the workflows and workflow results open and extensible FIG. 1 depicts an exemplary system 100 for distributed asynchronous dependency-based content processing, according to some embodiments of the disclosure. As an example, in order to extract information from audio, image, text, and/or cyber content, the system receives a series of algorithms where input to one depends on output from another (a workflow), for example, in real-time. In some embodiments, system 100 processes configurable analytic workflows asynchronously on horizontally scalable edge hardware, e.g., a plurality of distributed processing (service) nodes, using message protocols. Analytic services can reside on same or different machine—so long as they implement messaging protocols.

As shown, system 100 receives data input (e.g., a multi-media digital content including metadata) and a specified workflow in real time, including specific algorithms for extract information from audio, image, text, and/or cyber content and one or more tasks (e.g., extracting information in this example) to performed on the multi-media digital content. The input data may be received from external system 102, for example one or more servers or from other processing nodes via a message, from other processing node (as the result of their processing in case of any data dependency), and/or from the user via an API. An input message 104 then formulates the input data in a message. In some embodiments, the external systems may produce a properly formatted input message 104 and transmit it to the input message queue 104.

The message is queued in an input message queue 106 stored on a computer memory, or an object storage 107. A workflow manager 108 determines the types of the multi-media digital content responsive to the metadata in the input data. In some embodiments, metadata may include information about the media object such as location (latitude/longitude, state, city), the device that generated the media (e.g., phone or camera type), information about the owner of the device that created the object (phone number, email address), and the like.

The types of the multi-media digital content may be voice, image, video, and/or any other type of multimedia content, in this example. Workflow manager 108 generates a workflow graph for each type of the multi-media digital content based on the types and the task to be performed on that workflow graph, including data dependency conditions of the task(s) to be performed. In some embodiments, workflow manager 108 is configurable to execute different workflows conditionally based on the metadata. Also, the system operator can configure a set of rules or mappings from metadata values to specific workflows. For example, if an audio object originates in France or Germany, workflow manager selects a workflow that only extracts French or German keywords.

As know appreciated by one skilled in the art, workflow manager 108 and result manager 120 also include electronics, communications and processing circuit for processing their task.

Workflow manager 108 also generates a task message for each workflow graph including a respective workflow graph, the task to be performed on the workflow graph, pointers to required data, and a result of a previous operation (if any) based on the data dependency conditions of the task. That is, workflow tasks (analytics) whose dependencies are satisfied are requested via a task message to the appropriate queue, for example one per analytic, in some embodiments. The task message is then input to a task queue 110 stored on a computer memory.

The next available job (with its specified algorithm) and current workflow information including the workflow graph for that job is formulated in a task message 112 and placed an input queue for that job. The task message 112 from the task queue 110 is also broadcast to the plurality of distributed processing (service) nodes in the network. However, only one (relevant) listener node consumes and processes the message. The plurality of distributed processing (service) nodes may include a speech analysis detector (SAD) 114A, a language identification detector (LID) 114B, and other analytic micro services 114C, such as video processing and the like.

Any processing (service) node that can perform that job (with the specified algorithm) listens to this broadcast task queue 110, inputs the graphs and related information from the broadcast message, performs the processing for the job, produces the results of the processing and store the results.

The workflow state, including the data dependencies of the job is maintained and updated in the messages being passed. In some embodiments, workflow state includes the workflow graph and an indicator of the current state (node in the graph) that the current job represents. By design, all nodes upstream (with paths that lead to the current node) are complete and the workflow state also includes any results that have been reported for those nodes.

The processing node broadcasts the results, and a result manager 116 observes the message and advances the workflow state (e.g., edges out of the current node in the workflow graph). If the dependencies of the next state are met, the result manager 116 or workflow manager 108 issues another task request to the next state queue. Otherwise, it marks the job as done, and waits for a message from other dependencies on that node.

For example, an automatic speech recognition (ASR) node may depend on (has incoming edges) from SAD and LID. The processing of one of these nodes will complete first, sending a result message. The result manager 116 recognizes this message (e.g., as a SAD) and attempts to advance the state. However, since LID processing is not completed, the result manager saves the fact that SAD is completed and does nothing else. When the LID message arrives, the result manager recognizes that it already received a SAD result message therefore it can then issue the ASR task message (and the workflow proceeds)

The processing (service) nodes broadcast the results to a shared message bus 118. Other processing (service) nodes in the network will listen to this broadcast and use the results in the broadcast message for processing of their own task, in the case of their input data being dependent on the result of the task performed by another node. The workflow manager updates data dependencies for results it receives and generates or revises the work flow graphs accordingly.

The workflow manager 108 (or managers) receives the results and repeats the process of broadcasting the next available job. In some embodiments, these queuing and messaging interfaces may be implemented in-memory or via TCP/IP networking. Microservices implement discrete analytic components, which can be implemented as containers, processes or sub-processes listen for job requests on analytic-specific queues and publish results and workflow metadata so the workflow manager can advance the data processing state. Larger results such as modified content (audio, image or large extracted text) can be shared via a URL to distributed data repository with a (e.g., HTTP) interface visible to all components, using messaging protocols, for example, advanced message queuing protocol (AMQP). This way, multiple processing nodes can listen to a single analytic queue in order to scale the processing across multiple nodes.

The workflow manager 108 (or managers) then accumulate the result messages broadcast from the respective processing node in a result message 120, based on the respective workflow graphs and the data dependency information therein. The result message 120 is then output to an external system 122, or to the user. In some embodiments, the use may access the "intermediate results" and the final (accumulated) result from their respective queues or messages.

In some embodiments, internal or external systems can respond to analytic results at any stage of processing. The digital content (the data which is being analyzed) can be embedded in the message (text or packet) or accessed via a storage medium 105.

For the purpose of the present disclosure, "data item" refers to a generic term for a digital file such as an audio file (e.g. WAV), image file (e.g. JPEG), packet, other binary files, or the like; and "analytic" refers to an algorithm that analyzes a data item and produces additional information, i.e., the result. In general, an analytic B has a dependency on another analytic A, if it needs the results from A in order to compute its algorithm on a data item. Additionally, analytic B depends on A, if the output of A is used to limit the data items presented to B. In this case, dependency is shown in a workflow graph by an edge from analytic A to analytic B. Analytics without dependencies between them can be executed in parallel.

When a data item X is paired with an analytic A, the system defines the pair (X, A) as a task that can be computed. An analytic often performs the same algorithm but can be configured to use different statistical or machine learning models to produce different output, such as automatic speech recognition (ASR) which has different models for different languages. Each (analytic, model) pair is treated as a distinct analytic from the perspective of a workflow and is assigned a different state in the workflow graph. Analytics may produce arbitrary result objects, represented by JSON data structures. The system can optionally store URL references to large objects (such as the transcripts of a long audio file) that might be more efficiently stored in a binary format in a database, memory or similar repository. In some embodiments, small content (e.g., text such as tweets) could be included in the message directly. The system can inspect the results of an analytic and either advance or halt the workflow, based on workflow specific conditions. Any analytic in the workflow graph without dependencies are considered initial states. For a new data item ingested by the system, tasks can be immediately generated for these analytics to start the processing.

Figure 2:
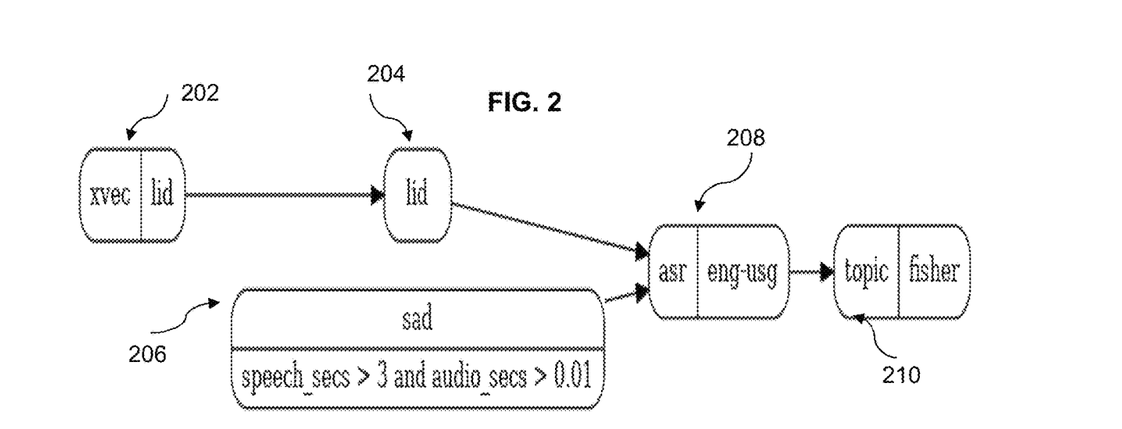
FIG. 2 shows an exemplary work flow graph for audio processing, according to some embodiments of the disclosure.

FIG. 2 shows an exemplary workflow graph for audio processing, according to some embodiments of the disclosure. In this example, block 202 represents xvec:lid.

In this case, xvec is a feature extractor for LID (language ID, e.g., English or Spanish-block 204. Block 206, includes a speech analysis detector (sad) and a piece of code that specifies a condition. Blocks 204 and 206 are input to block 208 to complete the processing. Block 208 include asr that is automatic speech recognition processing and eng-usg for English speech.

For this example of audio workflow, the main dependency is that asr 208 must know the lid results 204 and sad 206 results. That is, asr 208 only processes English speech (lid), and needs to know where the speech is in the audio (sad). The workflow starts by running xvec:lid and sad in parallel. xvec:lid is a feature extractor for lid. Once the xvec:lid completes, lid is run, which determines the language of the audio input. sad determines the location and amount of speech in the audio since for an audio recording, 50% or more of the total recording may be silence or non-speech sounds. Once both these analytics are complete, asr:eng-usg (English-US-general) executes only if lid has output a score for English >0.5 and only if sad reports more than 3 seconds of speech.

Using the above exemplary workflow, the system simulates the input message, task messages, and result messages for an audio file containing English speech, fe_03_00018_A-1.wav and associates a URL with the file, which is uses to obtain a UUID (universally unique identifier) for the data item as well:

The following is an exemplary pseudo-code for input message:

```
http://tapedeck:18080/deck/27d556e0-3d3d-435e-a862-4e1 {
"uuid": "27d556e0-3d3d-435e-a862-4e19e9bb19d0",
"metadata": {
"id": "fe_03_00018_A-1",
"subset": "unknown"},
"uri": "http://tapedeck:18080/deck/27d556e0-3d3d-435e-
a862-4e19e9bb19d0"
}
```

Because both the "xvec:lid" and "sad" analytics have no dependencies, the system sends request messages to their analytic queues simultaneously.

The following is an exemplary pseudo-code for task message for "sad" and "xvec:lid" analytics:

```
{
"uri":
"http://tapedeck:18080/deck/27d556e0-3d3d-435e-a862-4e19e9bb19d0",
"uuid": "27d556e0-3d3d-435e-a862-4e19e9bb19d0",
"metadata": {"id": "fe_03_00018_A-1", "subset": "unknown"},
"wfuid": "37e6c668d835464281a983076149e715",
"workflow": {
```

```
    "label": "default", "jobs": {
    "1.1": {"task": "xvec:lid", "next": ["1.2"]},
    "1.2": {"task": "lid", "next": ["1.4"]},
    "1.3": {"task": "sad", "current": true, "next": ["1.4"]},
    "1.4": {"task": "asr:eng-usg", "next": ["1.5"]},
    "1.5": {"task": "topic:fisher"}},
    "postconditions": {"sad": "speech_secs > 3 and audio_secs > 0.01"},
"preconditions": {"asr:eng-usg": "lid\eng-usg > 0.5"}
    }
    }
    {
    "uri": "http://tapedeck:18080/deck/27d556e0-3d3d-435e-a862-4e19e9bb19d0",
"uuid": "27d556e0-3d3d-435e-a862-4e19e9bb19d0",
    "metadata": {"id": "fe_03_00018_A-1", "subset": "unknown"},
"wfuid": "37e6c668d835464281a983076149e715",
    "workflow": {
    "label": "default", "jobs": {
    "1.1": {"task": "xvec:lid", "current": "true", "next": ["1.2"]},
    "1.2": {"task": "lid", "next": ["1.4"]},
    "1.3": {"task": "sad", "next": ["1.4"]},
    "1.4": {"task": "asr:eng-usg", "next": ["1.5"]},
    "1.5": {"task": "topic:fisher"}},
    "postconditions": {"sad": "speech_secs > 3 and audio_secs > 0.01"},
"preconditions": {"asr:eng-usg": "lid\eng-usg > 0.5"}
    }
    }
```

Each analytic executes independently, then generates a result message, which copies the workflow and data item information (metadata) from the request message, plus the actual results (shown in Bold font). The following is an exemplary

```
data item information (metadata) from the request message, plus
the actual results (in Bold) {
    "metadata": {"id": "fe_03_00018_A-1", "subset": "unknown"},
    "result_data": {
    "features": {"vad": "<RAW_DATA>"},
    "scores": {"audio_secs": 29.98, "speech_secs": 15.67},
    "segments": [[0.35, 0.43], [0.55, 1.01], [2.87, 2.91],
    [3.22, 3.74], [3.78, 4.4], [4.43, 4.91],
    [7.28, 8.52], [9.46, 9.68], [9.73, 10.17]]
    },
    "task_model": "tdnn-mfcc-2l",
    "task_type": "SAD",
    "task_version": "nnet2sad",
    "timestamp": "2022-06-30T15:19:05Z",
    "uri": "http://tapedeck:18080/deck/727131ce-bbce-4a04-bc54-57d09a722501",
    "uuid": "727131ce-bbce-4a04-bc54-57d09a722501",
    "wfuid": "147901b4fa4945c5ba07469ad7505214",
    "workflow": {
    "label": "default",
    "jobs": {
    "1.1": {"task": "xvec:lid", "next": ["1.2"]},
    "1.2": {"task": "lid", "next": ["1.4"]},
    "1.3": {"task": "sad", "current": true, "next": ["1.4"]},
    "1.4": {"task": "asr:eng-usg", "next": ["1.5"]},
    "1.5": {"task": "topic:fisher"}},
    "postconditions": {"sad": "speech_secs > 3 and audio_secs > 0.01"},
    "preconditions": {"asr:eng-usg": "lid\eng-usg > 0.5"}
    }
    }
    "metadata": {"id": "fe_03_00018_A-1", "subset": "unknown"},
    "result_data": {
    "features": {"xvector": "<RAW_DATA>"}
    },
    "task_model": "xvec-tdnn12",
    "task_type": "xvec:lid",
    "task_version": "1.0",
    "timestamp": "2022-06-30T15:19:05Z",
    "uri": "http://tapedeck:18080/deck/727131ce-bbce-4a04-bc54-57d09a722501",
    "uuid": "727131ce-bbce-4a04-bc54-57d09a722501",
```

```
    "wfuid": "147901b4fa4945c5ba07469ad7505214",
    "workflow": {
    "label": "default",
    "jobs": {
    "1.1": {"task": "xvec:lid", "current": true, "next": ["1.2"]},
    "1.2": {"task": "lid", "next": ["1.4"]},
    "1.3": {"task": "sad", "current": true, "next": ["1.4"]},
    "1.4": {"task": "asr:eng-usg", "next": ["1.5"]},
    "1.5": {"task": "topic:fisher"}},
    "postconditions": {"sad": "speech_secs > 3 and audio_secs > 0.01"},
    "preconditions": {"asr:eng-usg": "lid\eng-usg > 0.5"}
    }
    }
```

At this point, only one of the dependencies for "asr:usg-eng" is complete, but the "lid" dependency ("xvec:lid") is complete, so that analytic can now run on the audio file. The again generates a request message for "lid", this time, it includes the results from the "xvec:lid" dependency, so "lid" can make use of it. The following is an exemplary pseudo-code for task message for "lid" with the prior results in bold font:

```
"uri":
"http://tapedeck:18080/deck/27d556e0-3d3d-435e-a862-4e19e9bb19d0",
"uuid": "27d556e0-3d3d-435e-a862-4e19e9bb19d0",
"metadata": {"id": "fe_03_00018_A-1", "subset": "unknown"},
"wfuid": "37e6c668d835464281a983076149e715",
"workflow": {
"label": "default",
"jobs": {
"1.1": {"task": "xvec:lid", "next": ["1.2"]},
"1.2": {"task": "lid", "current": "true", "next": ["1.4"]},
"1.3": {"task": "sad", "next": ["1.4"]},
"1.4": {"task": "asr:eng-usg", "next": ["1.5"]},
"1.5": {"task": "topic:fisher"}},
"postconditions": {"sad": "speech_secs > 3 and audio_secs > 0.01"},
"preconditions": {"asr:eng-usg": "lid\eng-usg > 0.5"}
},
"result_data":
{"xvec:lid":
{"features": {"xvector": <RAWDATA> }
```

Once the LID analytic completes, the processing node broadcasts its result message. The following is an exemplary pseudo-code for result message for "lid":

```
"metadata": {"id": "fe_03_00018_A-1", "subset": "unknown"},
"result_data": {
"scores": {"qsl-rus": 4.45e−07, "qsl-pol": 8.82e−07,
"ara-apc": 1.10e−06, "ara-ary": 7.41e−07,
"ara-acm": 3.10e−07, "zho-cmn": 5.14e−07,
"spa-lac": 3.00e−07, "spa-car": 3.48e−07,
"spa-eur": 6.85e−07, "zho-nan": 3.44e−07,
"por-brz": 5.67e−07, "eng-gbr": 0.001,
"eng-usg": 0.9986, "ara-arz": 5.10e−08}
}
},
"task_model": "xvec-tdnn12",
"task_type": "xvec:lid",
"task_version": "1.0",
"timestamp": "2022-06-30T15:19:05Z",
"uri":
"http://tapedeck:18080/deck/727131ce-bbce-4a04-bc54-57d09a722501",
"uuid": "727131ce-bbce-4a04-bc54-57d09a722501",
"wfuid": "147901b4fa4945c5ba07469ad7505214",
"workflow": {
"label": "default",
"jobs": {
"1.1": {"task": "xvec:lid", "next": ["1.2"]},
"1.2": {"task": "lid", "current": true, "next": ["1.4"]},
```

```
"1.3": {"task": "sad", "current": true, "next": ["1.4"]},
"1.4": {"task": "asr:eng-usg", "next": ["1.5"]},
"1.5": {"task": "topic:fisher"}},
"postconditions": {"sad": "speech_secs > 3 and audio_secs > 0.01"},
"preconditions": {"asr:eng-usg": "lid\eng-usg > 0.5"}
},
"result_data": {
"xvec:lid":
{"features": {"xvector": <RAWDATA> } }
}
}
```

Now that LID analytic has completed, the asr:usg-eng analytic can proceed, as both its dependencies are complete. The system then sends a task message to the asr:usg-eng analytic, as follows:

```
{
"uri":
"http://tapedeck:18080/deck/27d556e0-3d3d-435e-a862-4e19e9bb19d0",
"uuid": "27d556e0-3d3d-435e-a862-4e19e9bb19d0",
"metadata": {"id": " fe_03_00018_A-1", "subset": "unknown"},
"wfuid": "37e6c668d835464281a983076149e715",
"workflow": {
"label": "default",
"jobs": {
"1.1": {"task": "xvec:lid", "next": ["1.2"]},
"1.2": {"task": "lid", "next": ["1.4"]},
"1.3": {"task": "sad", "next": ["1.4"]},
"1.4": {"task": "asr:eng-usg", "current": "true", "next": ["1.5"]},
"1.5": {"task": "topic:fisher"}},
"postconditions": {"sad": "speech_secs > 3 and audio_secs > 0.01"},
"preconditions": {"asr:eng-usg": "lid\eng-usg > 0.5"}
},
"result_data": {
"xvec:lid":
{"features": {"xvector": < RAWDATA> } },
"sad" : {
"features": {"vad": "<RAW_DATA>"},
"scores": {"audio_secs": 29.98, "speech_secs": 15.669999999999995},
"segments": [[0.35, 0.43], [0.55, 1.01], [2.87, 2.91],
[3.22, 3.74], [3.78, 4.4], [4.43, 4.91],
[7.28, 8.52], [9.46, 9.68], [9.73, 10.17]]
}
}
}
```

The workflows represent higher order operations on documents—speech detection, language identification, face detection, etc., rather than arbitrary code. The system can by modified and extended by modifying configuration and starting available services that support the messaging protocols and therefore not requiring adding code to the system itself. The state of processing is passed within messages, allowing both asynchronous and distributed processing of multi-step workflows. Message passing protocol can support in-memory (embedded) processing and multi-node, multi-processor distributed network-based processing. There is no centralized scheduling mechanism (as with AWS/Lambda). In some embodiments, the system does not require preconfigured or centrally managed workflows or workflow components (algorithms). Rather, the system allows for workflows to be defined "on the fly" (real-time) in terms of algorithms which are instantiated as micro-services reading requests of a uniquely named queue.

In some embodiments, the queue is named by a 2-layer naming structure, which is a combination of the analytic and the model. For instance, for an U.S. English ASR system, the "asr:eng-usg" has a different queue than a Spanish ASR system ("asr:spa-eur"). The strings are potentially arbitrary, and are coordinated by the system designer, workflows and instantiating analytics. For example, the system designer may have a workflow that has both U.S. English and British English ASR systems, produce a workflow with an analytic (and corresponding queue) "asr:eng", and obtain an US or UK model to service the queue (the analytic is given to the queue it must listen to). In some embodiments, a workflow is able to distinguish the 2 English models. Therefore, an "asr:eng-usg" and an "asr:eng-gbr" analytic are defined, and the ASR analytic microservices are set up to point to separate queues.

In some embodiments, new analytics (algorithms) can easily be added as new microservices to be processed by the system. Moreover, the new workflow graphs and algorithms can be added on the fly. For example, for a new analytic integration with the system, the input implement (AMQP) message handling method that maps to analytic function inputs. The output inserts analytic outputs into the message results object and broadcasts them. The analytic components can run as a standalone process, thread, or docker container.

Figure 3A:
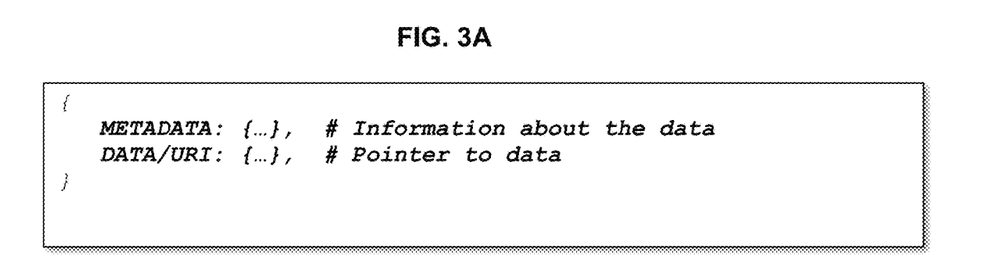
FIG. 3A shows an exemplary input message, according to some embodiments of the disclosure.

FIG. 3A shows an exemplary input message, according to some embodiments of the disclosure. As shown, the input message includes metadata with information about the data and pointer to the data.

Figure 3B:
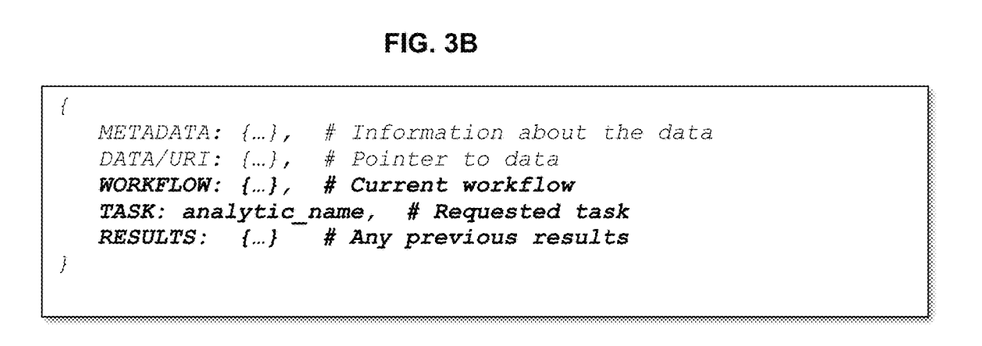
FIG. 3B illustrates an exemplary task message, according to some embodiments of the disclosure.

FIG. 3B illustrated an exemplary task message, according to some embodiments of the disclosure. As shown, the tasks message includes metadata with information about the data; pointer to the data; a current workflow graph, a requested task (with analytics name); and results including any previous results.

Figure 3C:
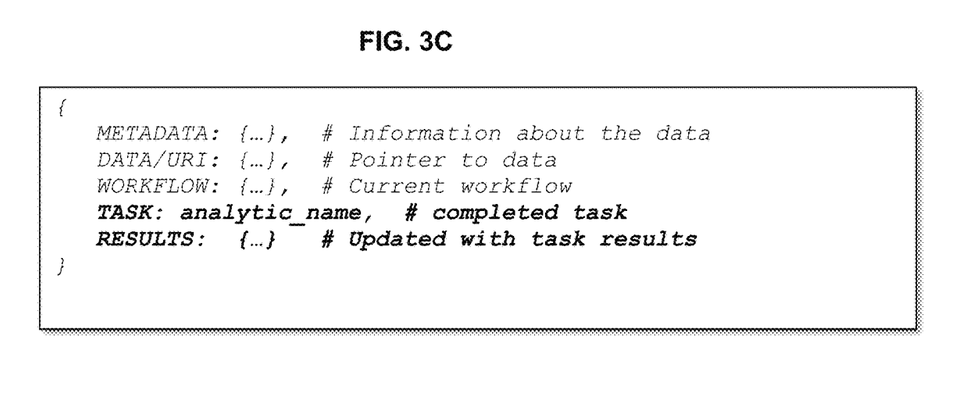
FIG. 3C depicts an exemplary result message, according to some embodiments of the disclosure.

FIG. 3C depicts an exemplary result message, according to some embodiments of the disclosure. As shown, the result message includes metadata with information about the data; pointer to the data; a current workflow graph, a completed task (with analytics name); and results that are updated with tasks result. The updated results block the aggregated results for all previously completed analytics in the workflow.

Figure 4:
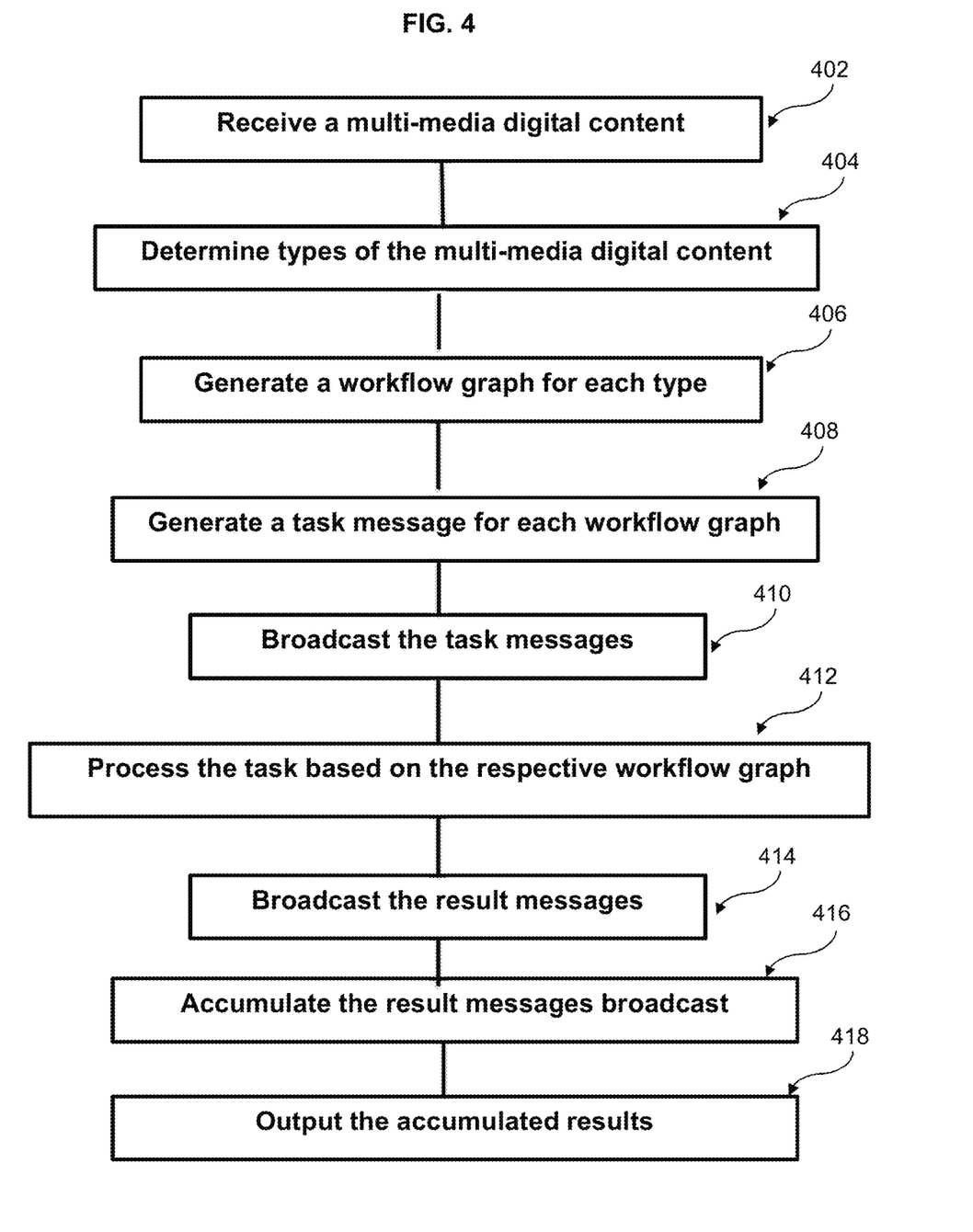
FIG. 4 shows an exemplary process flow for distributed asynchronous dependency-based content processing, according to some embodiments of the disclosure.

FIG. 4 shows an exemplary process flow for distributed asynchronous dependency-based content processing in a multi-node processing environment, according to some embodiments of the disclosure. As depicted, a multi-media digital content that including metadata and a task to performed on the multi-media digital content is received in block 402. For example, the system is to extract information from audio, image, text, or any cyber content. The content may be received from external systems, from other processing nodes in the network via a message, from other processing node (as the result of their processing in case of any data dependency), and/or from the user via an API. In block 404, the types of the multi-media digital content (e.g., voice, image, video, and/or any other type of multimedia content) are determined based on the received metadata, for example by the workflow manager 108 in FIG. 1.

In block 406, a workflow graph for each type of the multi-media digital content is generated responsive to the determine types and the received task to be performed on each workflow graph. As explained above, each workflow graph includes data dependency conditions of its task. In block 408, a task message is generated for each workflow graph, including a task message comprising the workflow graph, the task to be performed, pointers to required data, and a result of a previous operation based on the data dependency conditions of the task. In block 410, the task messages are broadcast to a respective task queue of an initial state of a workflow manager. In other words, the next available job (with its specified algorithm) and current workflow information including the workflow graph for that job is formulated in the task message and placed an input queue for that job. Other processing nodes in the network listen to this broadcast and use the results in the broadcast message for processing of their own task, if their input data is dependent on the result of the task performed by another node.

In block 412, a processing node in the multi-node processing environment that is capable of and available for performing that specific task responds to that specific broadcast task message and processes the task based on the workflow graph for that specific task in the broadcast task message, and includes result of the processing for each workflow graph in a result message. The result message(s) are then broadcast by the respective processing nodes that have produced the results, in block 414. The result messages are then accumulated in block 416 and output to the user or an external system in block 418.

This way, the message passing protocol supports the blocks in FIG. 1 (management, queues, and analytics) to be instantiated as in-memory processes or processes on remote networked processing (service) nodes. As a result, an embedded, multi-node, multi-processor distributed network-based processing is enabled with a single framework. There is no centralized scheduling mechanism and workflow state is persisted in messages as they flow (broadcast) through the system.

In case of a new job, new content or revised workflow graphs, workflow graphs can be re-configured rather than developing new software for them, resulting in less resources need for software development. The process of the disclosure may be executed on heterogeneous hardware environments (e.g., embedded/single machine, laptop, cluster, and the like), again without additional software development. In some embodiments, analytic scaling may be accomplished by single laptop hosting the system and a Voice KW Spotting workflow. For higher loads, additional components can be added on an adjacent laptop or compute device, configured to read from the original laptop's task queue. As an example, with the automatic speech recognition (ASR) as the compute bottleneck, throughput scales roughly linearly with the number of additional nodes.

For an infrastructure scaling, in a single laptop hosting the system and a text language ID plus sentiment analysis workflow, the message volume, rather than the analytics, are the bottleneck. The messaging protocols are designed to support multiple broker, horizontally scalable nodes for infrastructure scaling.

It will be recognized by those skilled in the art that various modifications may be made to the illustrated and other embodiments of the disclosure described above, without departing from the broad scope thereof. It will be understood therefore that the disclosure is not limited to the particular embodiments or arrangements disclosed, but is rather intended to cover any changes, adaptations or modifications which are within the scope and spirit of the disclosure as defined by the appended claims and drawings.

The invention claimed is:

1. A method for distributed asynchronous dependency-based content processing in a multi-node processing environment, the method comprising:
   receiving a multi-media digital content including metadata and a task to be performed on the multi-media digital content;
   determining types of the multi-media digital content responsive to the metadata;
   generating a workflow graph for each type of the multi-media digital content responsive to the types and the task, wherein each workflow graph includes data dependency conditions of the task;
   generating a task message for each workflow graph, wherein each task message includes a respective workflow graph, the task to be performed, an indicator of a node in the workflow graph representing a workflow state of the task, pointers to required data, and a result of a previous operation based on the data dependency conditions of the task;
   broadcasting the task messages to a respective task queue of an initial state of a workflow manager;
   responding to the broadcast task messages by a respective processing node in the multi-node processing environment;
   processing the task based on the respective workflow graph in the broadcast task message, and including a result of the processing for each workflow graph in a result message;
   broadcasting the result messages by the respective processing node;
   accumulating the result messages broadcast from the respective processing node responsive to respective workflow graphs; and
   outputting the accumulated results to a user or an external system.

2. The method of claim 1, wherein the messages use an advanced message queuing protocol (AMQP).

3. The method of claim 1, wherein the multi-media digital content is received from an application programming interface (API).

4. The method of claim 1, wherein the multi-media digital content is received from a server via a message.

5. The method of claim 1, wherein the multi-media digital content is received from other processing nodes in the multi-node processing environment via a message.

6. The method of claim 1, wherein the types of the multi-media digital content include one or more of voice, image and video.

7. The method of claim 1, further comprising reconfiguring the workflow graphs, when the digital content is changed.

8. The method of claim 1, further comprising reconfiguring the workflow graphs, when any of the workflow graphs is changed.

9. The method of claim 1, wherein the messages are instantiated as in-memory processes or processes on remote networked processing nodes.

10. A distributed asynchronous network for dependency-based content processing comprising:
    a plurality of processing nodes, communication with a message protocol;
    an input queue stored in a computer memory for receiving a multi-media digital content including metadata and a task to be performed on the multi-media digital content;
    a workflow manager for determining types of the multi-media digital content responsive to the metadata, and generating a workflow graph for each type of the multi-media digital content responsive to the types and the task, wherein each workflow graph includes data dependency conditions of the task; and generating a task message for each workflow graph, wherein each task message includes a respective workflow graph, the task to be performed, an indicator of a node in the workflow graph representing a workflow state of the task, pointers to required data, and a result of a previous operation based on the data dependency conditions of the task; and a task queue stored on a computer memory for broadcasting the task messages to a respective task queue of an initial state of the workflow manager, wherein each processing node broadcasts its task message and a respective processing node responds to the broadcast task messages and processes the task based on a respective workflow graph in the broadcast task message, includes a result of the processing for the respective workflow graph in a result message, and broadcasts the result messages, wherein the workflow manager accumulates the result messages broadcast from the respective processing node responsive to respective workflow graphs, and outputs the accumulated results to a user or an external system.

11. The distributed asynchronous network of claim 10, wherein the messages use an advanced message queuing protocol (AMQP).

12. The distributed asynchronous network of claim 10, wherein the multi-media digital content is received from an application programming interface (API).

13. The distributed asynchronous network of claim 10, wherein the multi-media digital content is received from a server via a message.

14. The distributed asynchronous network of claim 10, wherein the multi-media digital content is received from other processing nodes in a multi-node processing environment via a message.

15. The distributed asynchronous network of claim 10, wherein the types of the multi-media digital content include one or more of voice, image and video.

16. The distributed asynchronous network of claim 10, wherein the workflow manager reconfigures the workflow graphs, when the digital content is changed.

17. The distributed asynchronous network of claim 10, wherein the workflow manager reconfigures the workflow graphs, when any of the workflow graphs is changed.

18. The distributed asynchronous network of claim 10, wherein the messages are instantiated as in-memory processes or processes on remote networked processing nodes.

19. The method of claim 1, further comprising:
determining that dependencies of a next workflow state of the task are satisfied; and
generating a task request for the next workflow state of the task based on the dependencies of the next workflow state of the task being satisfied.

20. A non-transitory, computer-readable medium storing instructions that, when executed by a system, cause the system to perform operations comprising:
receiving a multi-media digital content including metadata and a task to be performed on the multi-media digital content;
determining types of the multi-media digital content responsive to the metadata;
generating a workflow graph for each type of the multi-media digital content responsive to the types and the task, wherein each workflow graph includes data dependency conditions of the task;
generating a task message for each workflow graph, wherein each task message includes a respective workflow graph, the task to be performed, an indicator of a node in the workflow graph representing a workflow state of the task, pointers to required data, and a result of a previous operation based on the data dependency conditions of the task;
broadcasting the task messages to a respective task queue of an initial state of a workflow manager;
responding to the broadcast task messages by a respective processing node in a multi-node processing environment;
processing the task based on the respective workflow graph in the broadcast task message, and including a result of the processing for each workflow graph in a result message;
broadcasting the result messages by the respective processing node;
accumulating the result messages broadcast from the respective processing node responsive to respective workflow graphs; and
outputting the accumulated results to a user or an external system.

* * * * *

UNITED STATES PATENT AND TRADEMARK OFFICE
CERTIFICATE OF CORRECTION

| | | |
|---|---|---|
| PATENT NO. | : 12,430,171 B2 | Page 1 of 1 |
| APPLICATION NO. | : 17/878777 | |
| DATED | : September 30, 2025 | |
| INVENTOR(S) | : Jonathan Wintrode | |

It is certified that error appears in the above-identified patent and that said Letters Patent is hereby corrected as shown below:

In the Specification

In Column 3, Line 29, delete "extensible" and insert --extensible.-- therefor

In Column 5, Line 5, delete "proceeds)" and insert --proceeds).-- therefor

Signed and Sealed this
Thirteenth Day of January, 2026

John A. Squires
*Director of the United States Patent and Trademark Office*